(12) United States Patent
Henriksen (10) Patent No.: US 9,982,711 B1
(45) Date of Patent: May 29, 2018

(54) ADJUSTABLE BALL JOINT

(71) Applicant: ECC & Associates, LTD, Elgin, IL (US)

(72) Inventor: Arne Jay Henriksen, Sleepy Hollow, IL (US)

(73) Assignee: ECC & Associates, LTD., Elgin, IL (US)

( * ) Notice: Subject to any disclaimer, the term of this patent is extended or adjusted under 35 U.S.C. 154(b) by 0 days. days.

(21) Appl. No.: 15/365,078

(22) Filed: Nov. 30, 2016

(51) Int. Cl.
*F16C 11/06* (2006.01)

(52) U.S. Cl.
CPC ....... *F16C 11/0642* (2013.01); *F16C 11/0614* (2013.01)

(58) Field of Classification Search
CPC . F16C 11/0614; F16C 11/069; F16C 11/0642; Y10T 403/32803; Y10T 403/32639; Y10T 403/32729; Y10T 403/32786; Y10T 403/58; Y10T 403/581; Y10T 403/583; Y10T 403/585; Y10T 403/589
See application file for complete search history.

(56) References Cited

U.S. PATENT DOCUMENTS

| | | | |
|---|---|---|---|
| 1,431,290 A | 10/1922 | Daggett, Jr. | |
| 1,693,840 A | 12/1928 | Faudi | |
| 2,708,591 A | 5/1955 | Schiesel | |
| 2,758,897 A * | 8/1956 | Naab | F16J 1/12 403/316 |
| 2,819,918 A * | 1/1958 | Seaquist | F16C 11/0623 403/134 |
| 2,900,196 A | 8/1959 | Nienke | |
| 2,954,993 A | 10/1960 | Scheublein, Jr. et al. | |
| 3,103,377 A | 9/1963 | Scheublein, Jr. et al. | |
| 3,552,208 A * | 1/1971 | Destache et al. | G01F 1/0755 73/861.81 |
| 4,037,980 A * | 7/1977 | Haentjens | F04D 29/044 403/31 |
| 4,179,239 A * | 12/1979 | Catterfeld | F04D 7/04 403/337 |
| 4,187,033 A | 2/1980 | Zukowski | |
| 5,360,282 A * | 11/1994 | Nagengast | B60Q 1/0683 403/119 |
| 5,564,853 A | 10/1996 | Maughan | |
| 6,550,120 B1 | 4/2003 | Maughan et al. | |
| 6,644,671 B1 * | 11/2003 | Maughan | F16C 11/0642 277/635 |

(Continued)

FOREIGN PATENT DOCUMENTS

| | | | | |
|---|---|---|---|---|
| DE | 380963 C | * | 9/1923 | .......... F16C 11/0642 |
| DE | 392620 C | * | 2/1925 | .......... F16C 11/0642 |

(Continued)

*Primary Examiner* — Jonathan P Masinick
(74) *Attorney, Agent, or Firm* — Greer, Burns & Crain, Ltd.

(57) ABSTRACT

An adjustable ball joint with a locking member and a retaining cap. The locking member is rotationally fixed relative to the housing, and the retaining cap and locking member and configured to be rotationally fixed relative to each other. The retaining cap may include a protrusion that engages a detent in the housing that prevents rotation of the locking member. The housing may include multiple detents to allow for the locking member to have multiple configurations. Threaded fasteners may secure the locking member to the retaining cap.

12 Claims, 7 Drawing Sheets

(56) References Cited

U.S. PATENT DOCUMENTS

| | | | |
|---|---|---|---|
| 8,079,607 B2 * | 12/2011 | Gaumer | F16C 11/0604 280/86.754 |
| 8,192,104 B2 * | 6/2012 | Mann | F16C 11/02 403/152 |
| 8,662,783 B2 | 3/2014 | Molenaar | |
| 8,757,648 B1 | 6/2014 | Winter | |
| 8,764,336 B2 | 7/2014 | Kraatz | |
| 8,794,860 B1 * | 8/2014 | McGean | F16C 11/0642 403/137 |
| 2002/0120339 A1 * | 8/2002 | Callaway | A61F 2/4014 623/19.14 |
| 2006/0193681 A1 * | 8/2006 | Holierhoek | F16C 11/0638 403/122 |
| 2008/0118301 A1 * | 5/2008 | Nishio | F16C 11/0614 403/122 |
| 2009/0238636 A1 * | 9/2009 | Howe | F16C 11/069 403/127 |
| 2012/0093573 A1 | 4/2012 | Molenaar | |
| 2013/0114996 A1 | 5/2013 | Kraatz | |
| 2013/0189020 A1 | 7/2013 | Kraatz | |
| 2013/0236238 A1 * | 9/2013 | Burton | F16C 11/06 403/135 |
| 2015/0176674 A1 * | 6/2015 | Khan | F16M 7/00 403/120 |

FOREIGN PATENT DOCUMENTS

| | | | | |
|---|---|---|---|---|
| EP | 1477690 A2 * | 11/2004 | | F16C 11/0614 |
| GB | 753234 A * | 7/1956 | | F16C 11/0642 |
| GB | 891798 A * | 3/1962 | | F16C 11/06 |
| WO | WO 2011019742 A1 * | 2/2011 | | B25J 15/04 |

\* cited by examiner

ADJUSTABLE BALL JOINT

FIELD OF THE INVENTION

This invention relates generally to an adjustable ball joint, and more particularly to an adjustable ball joint for connection between two structural members.

BACKGROUND OF THE INVENTION

Ball joints are often utilized for providing rotational connection between structural members. For example, such ball joints are, typically found in vehicles wherein the ball joints support the wheels of the vehicles. The ball joints are used to connect control arms, steering knuckles, spindle brackets, tie rods, and other structural members of the vehicles.

Such ball joints typically comprise a housing and a ball member. The ball member comprises a shaft portion extending out of the housing and a ball portion that is contained within the housing. A cap is secured to the housing to maintain the ball member in the housing and permit the shaft to be moved or rotated.

While these ball joints are presumably effective for their intended purposes, many conventional ball joints require large tools, or other implements, to adjust or remove the cap. The large tool, in turn, requires the cap on the housing to be large, which can increase the weight of the ball joint. Additionally, the large cap can reduce the clearance associated with the ball joint and adjacent structural members.

Additionally, in some applications, for example, in car racing, the degree of movement can impact the vehicle's suspension. The suspension can influence the overall speed of the vehicle. Accordingly, in such applications it is desirable to adjust the ball joints to have a level of movability/rotation where the ball joint has a desired stiffness. The term "stiffness" refers to the relative ease/difficulty at which the ball member rotates relative to the housing. However, most conventional ball joints are not adjustable and do not allow for the precise adjustment needed to achieve the desired stiffness.

Therefore, there is a need for a new adjustable ball joint that addresses one or more of these short comings.

SUMMARY OF THE INVENTION

The present invention is directed at solving one or more of the short comings associated with the conventional ball joints. Accordingly, a new ball joint for connecting structural members is provided. The new ball joint has a smaller retaining cap which lowers the weight of the retaining cap and also reduces the clearance of the retaining cap. The new ball joint utilizes a locking member which may be secured to the retaining cap. The locking member allows for precise adjustments of the present ball joint so that a desired configuration can more easily and quickly be achieved, along with allowing for a more precise stiffness to be achieved. Further, the locking member maintains the selected adjustment of the ball joint after the ball joint is reinstalled between the structural members.

In various aspects, the present ball joint for connection between structural member comprises a housing, a ball member, a retaining cap, and a locking member. The housing comprises a body with an outer surface, an inner cavity, a first aperture, and a second aperture. The first and second apertures are disposed on opposite ends of the body and communicate with the cavity. The ball member comprises a ball portion and a shaft portion. The ball member is configured such that ball portion is received within the inner cavity of the housing and the shaft portion extends out of the first aperture. The ball portion is precluded from passing through the first aperture. The retaining cap comprises an outer surface and is configured to engage with inner cavity of the body and prevent the ball portion from passing through the second aperture. The locking member is rotationally fixed relative to the housing and is configured to prevent rotation of the retaining cap relative to the housing. The locking member may include at least one slot and the retaining cap includes at least one threaded bore. The ball joint may further comprise a threaded fastening member having a threaded shank configured to pass through the at least one slot in the locking member and engage the at least one threaded bore of the retaining cap. The locking member may include at least one protrusion configured to engage at least one detent in the inner cavity of the housing to prevent the locking member from rotating relative to the housing. The inner cavity of the housing can include two or more detents. The two or more detents can be angularly offset from each other. The locking member may include at least one slot and the retaining cap may include at least one threaded bore. The ball joint may further comprise a threaded fastening member configured to pass through the at least one slot in the locking member and engage the at least one threaded bore of the retaining cap. The locking member includes a plurality of slots.

In another aspect, the present ball joint for connection between structural members comprises a housing, a ball member, a retaining cap, and a locking member. The housing comprises a body with an outer surface, an inner cavity having a threaded portion, a first aperture, and a second aperture. The first and second apertures are disposed on opposite ends of the body. The ball member comprises a ball portion and a shaft portion. The shaft portion extends out of the first aperture of the housing. The retaining cap threadedly engages the threaded portion of the inner cavity of the body. The locking member is disposed in the housing and configured to prevent rotation of the retaining cap relative to the housing. The locking member can be secured to the retaining cap with at least one fastening element. A portion of the at least one fastening element may pass through a slot in the locking member. The locking member may engage with the housing. The locking member may be configured to engage the inner cavity of the housing and provide at least two different orientations relative to the housing for receiving the at least one fastening element.

In another aspect, the present ball joint for connection between structural members comprises a housing, a ball member, a retaining cap, a seat, and a locking member. The housing comprises a body with an outer surface, an inner cavity having a threaded portion and a seat portion, a first aperture, and a second aperture. The first and second apertures are disposed on opposite ends of the body and the first aperture extends through the seat portion. The ball member comprises a ball portion and a shaft portion. The shaft portion extends out of the first aperture of the housing, and the ball portion is received on the seat portion of the inner cavity. The retaining cap threadedly engages the threaded portion the inner cavity of the housing. A seat is disposed between the retaining cap and the ball member. The locking member can be disposed in the housing and configured to engage with the housing and prevent rotation of the retaining cap relative to the housing. The seat can be integral with the retaining cap. The ball joint may further comprise at least one fastener securing the retaining cap to the locking member. The locking member may comprise a plurality of slots spaced along a circumference of a circle and arranged to allow the at least one fastener to pass therethrough. The locking member may comprise a circular disk with at least one protrusion on an outer circumference, and the housing can comprise a detent configured to engage the protrusion to prevent rotation of the locking member. The housing can include at least two detents each configured to engage the protrusion to prevent rotation of the locking member. The detents can be angularly offset. The locking member may be disposed within the second aperture of the housing.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

With these above general aspects in mind, one or more embodiments of the present invention will be described with the understanding that the following description is not intended to be limiting.

Figure 1:
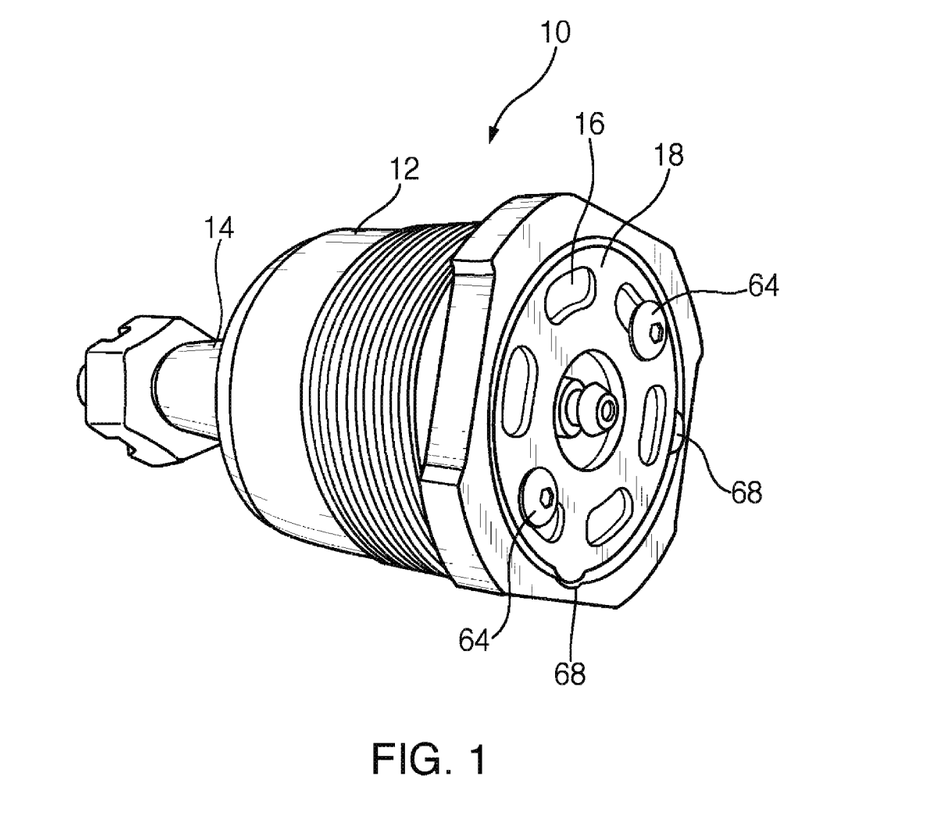
FIG. 1 is a front and side perspective view of the present ball joint according to one or more aspects of the present invention.
Figure 2:
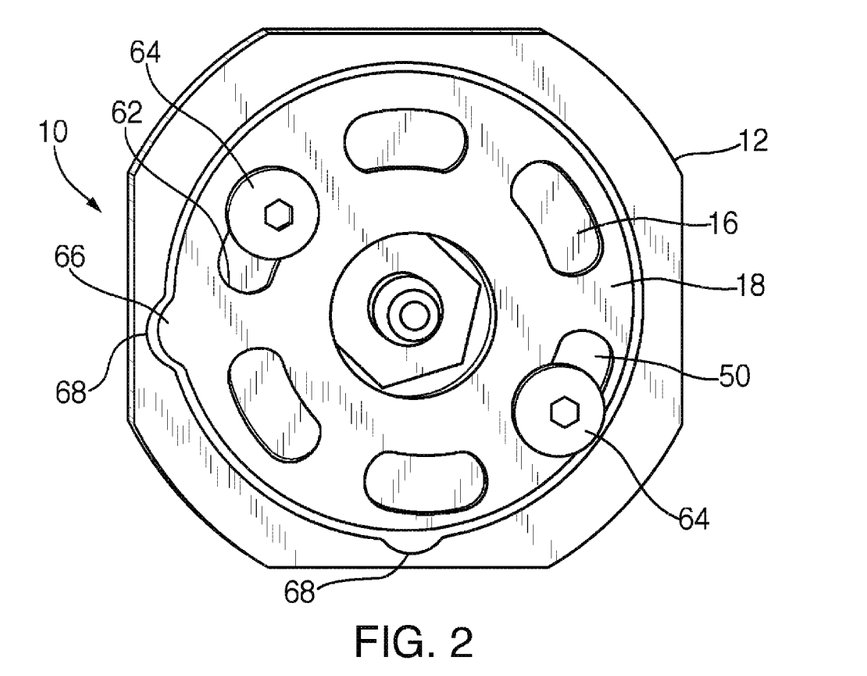
FIG. 2 is a front view of the ball joint shown in FIG. 1.
Figure 3:
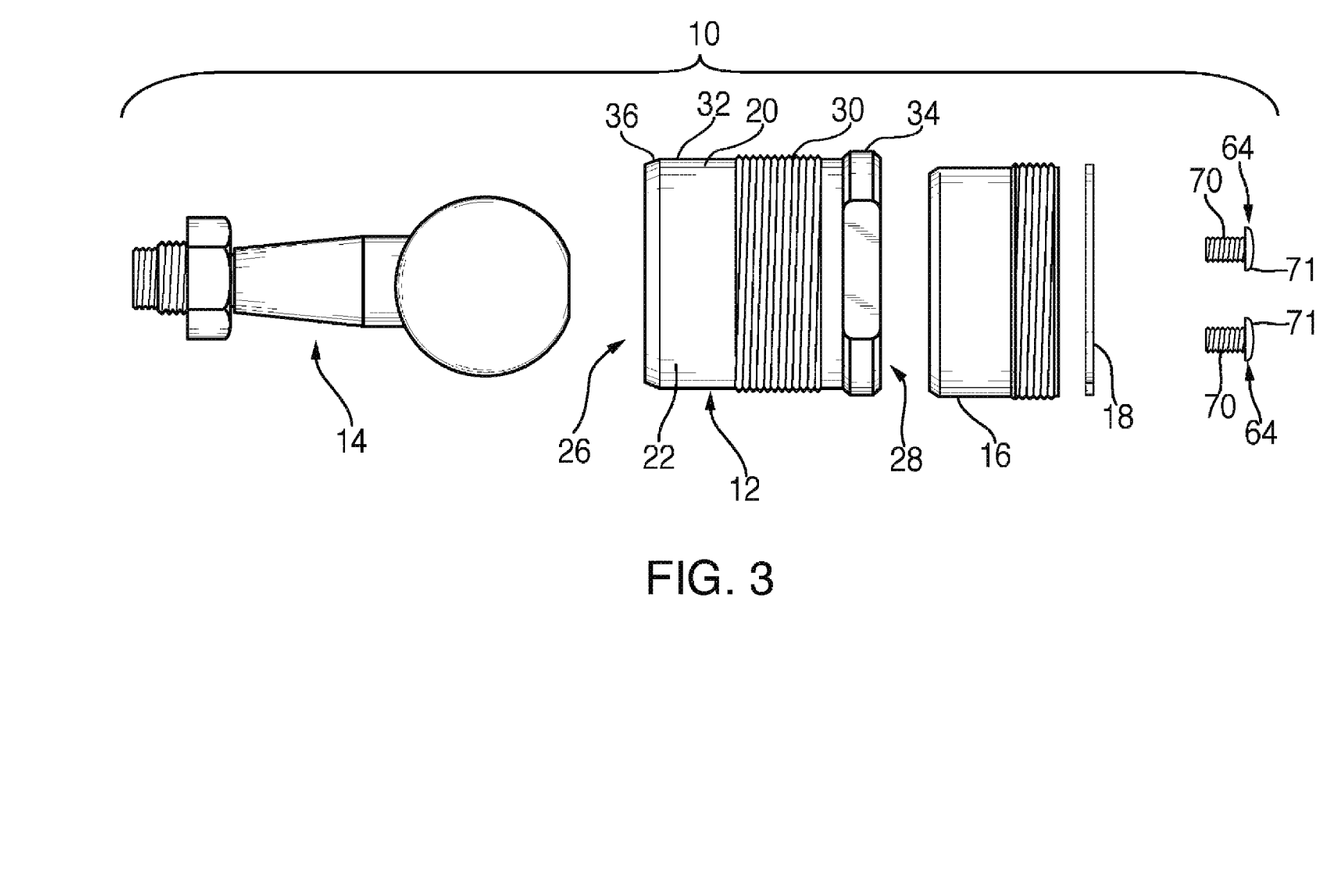
FIG. 3 is a side exploded view of the ball joint shown in FIG. 1.

With reference to FIGS. 1 to 3, a ball joint 10 is provided which is used for connection between two structural members, in a particular embodiment, two structural members of a vehicle. The ball joint 10 comprises a housing 12, a ball member 14, a retaining cap 16, and a locking member 18. While any suitable materials may be used, including for example steel, it is contemplated that the housing 12 comprises a zinc dichromate plating to minimize rusting and binding. Additionally, the retaining cap 16 preferably comprises aluminum.

Figure 4:
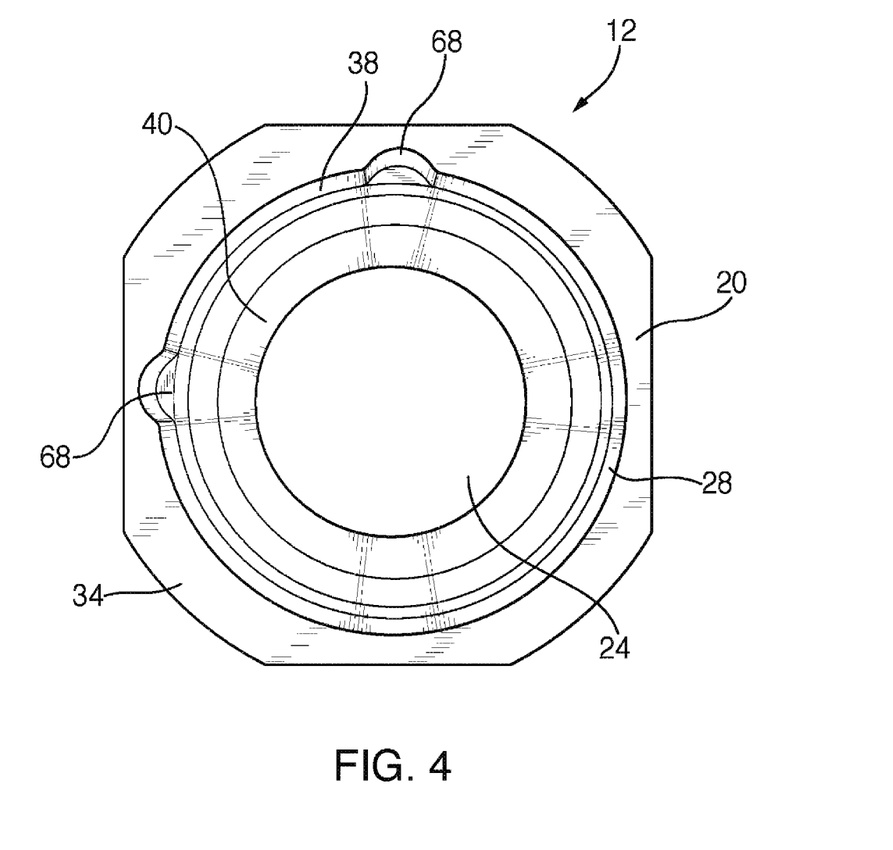
FIG. 4 is a front view of the housing of the ball joint shown in FIG. 1.
Figure 5:
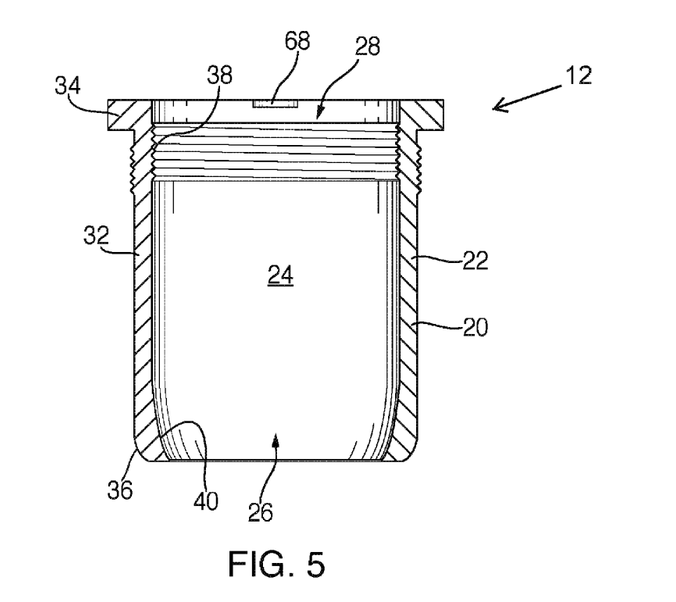
FIG. 5 is a side cutaway view of the housing shown in FIG. 4.

As seen in FIGS. 3 to 5, the housing 12 comprises a body 20 with an outer surface 22, an inner cavity 24, a first aperture 26, and a second aperture 28. The first aperture 26 and the second aperture 28 communicate with the inner cavity 24 and are disposed on opposite ends of the body 20. The body 20 preferably has a generally cylindrical shape with the first aperture 26 formed at one end (the bottom in FIG. 5) and the second aperture 28 formed at the other end (the top in FIG. 5).

The outer surface 22 includes a threaded portion 30, a smooth portion 32, and a flange portion 34. The flange portion 34 is configured to be engaged by a tool or other implement. The threaded portion 30 is for engaging any adjacent structural member (not shown). The smooth portion 32 may include a tapered edge 36 to facilitate the insertion of the ball joint 10 into the structural member. Preferably, the outer surface 22 is waxed to facilitate installation of the ball joint 10.

Proximate the second aperture 28, the inner cavity 24 comprises a threaded portion 38. Opposite the threaded portion 38, and proximate the first aperture 26, the inner cavity 24 comprises a seat portion 40.

Figure 6:
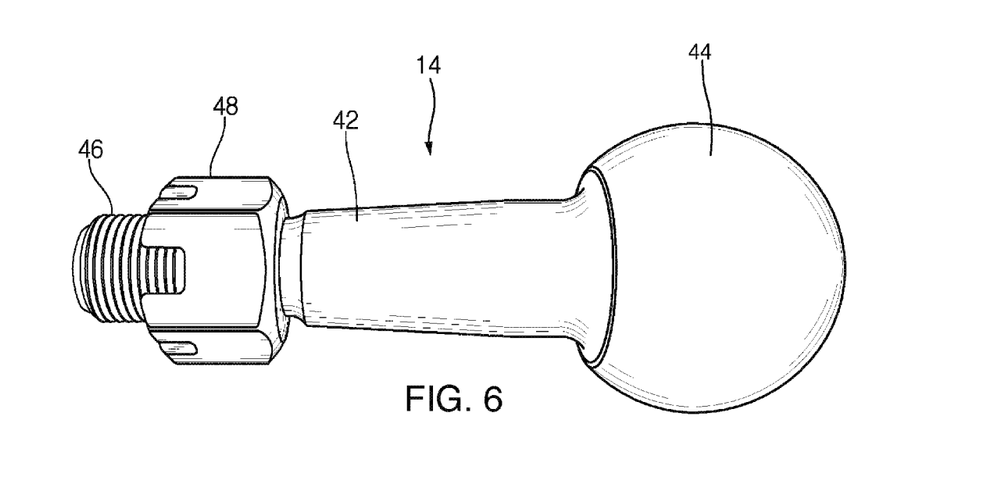
FIG. 6 is a side view of the ball member of the ball joint shown in FIG. 1.

Turning to FIG. 6, the ball member comprises a shaft portion 42 and a ball portion 44. When inserted into the housing 12 (as shown in FIG. 1), the shaft portion 42 extends out of the first aperture 26 of the housing 12. The ball portion 44 is received on the seat portion 40 of the inner cavity 24 of the body 20. The shaft portion 42 may also include threaded portion 46 and a nut 48 for securing the ball joint 10 to a structural member.

Figures 7, 8:
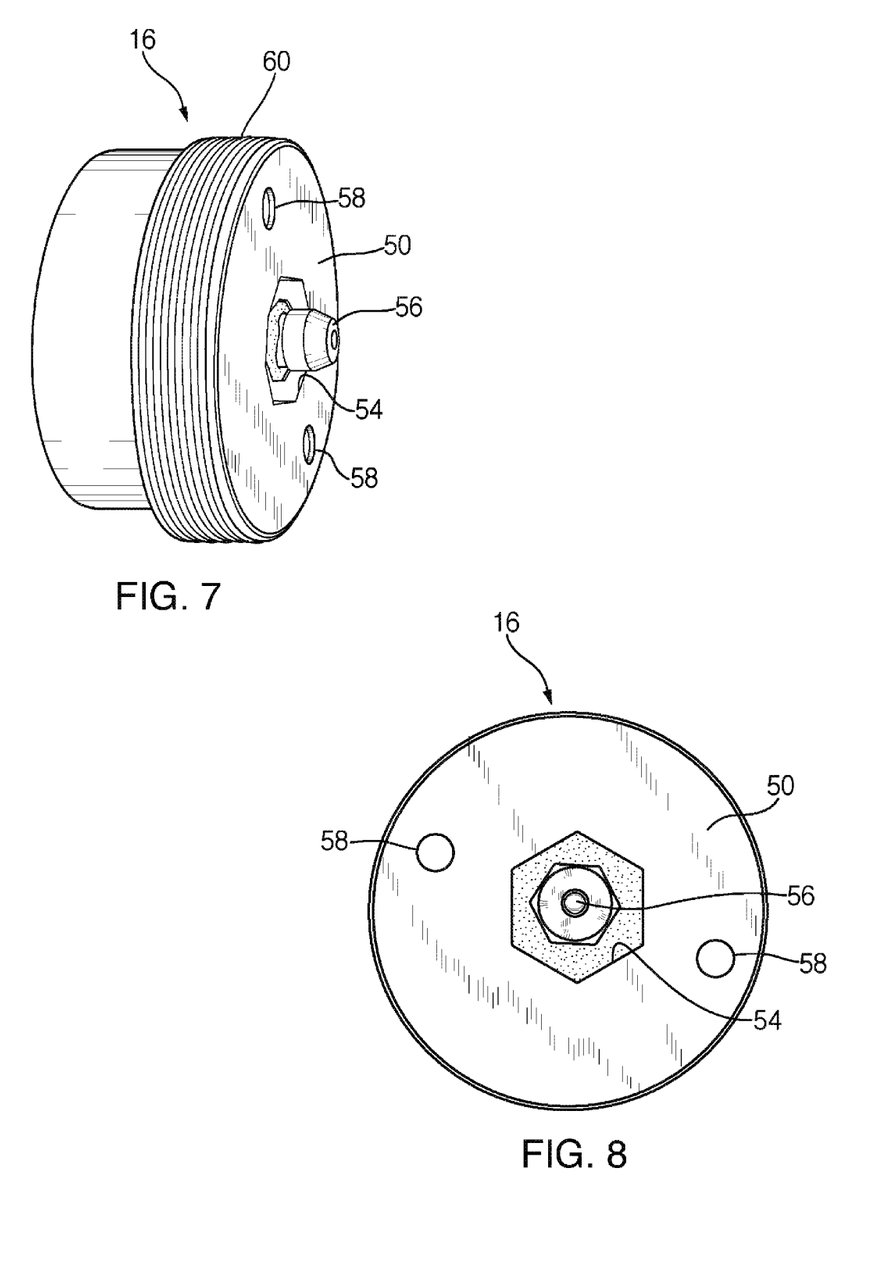
FIG. 7 is a front and side perspective view of the retaining cap of the ball joint shown in FIG. 1.
FIG. 8 is a front view of the retaining cap shown in FIG. 7.
Figure 9:
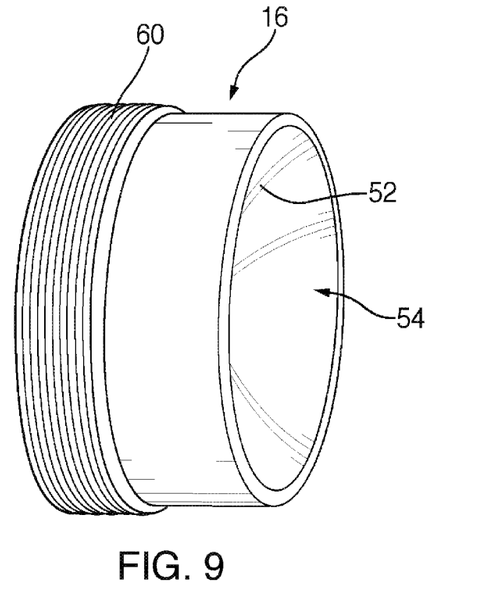
FIG. 9 is a side and back perspective view of the retaining cap shown in FIG. 7; and, FIG. 10 is a front view of the locking member of the ball housing shown in FIG. 1.

In an assembled configuration (see, FIG. 1), the retaining cap 16 is received in the inner cavity 24 and prevents the ball portion 44 from passing out of the second aperture 28 of the housing 12. As shown in FIGS. 7 to 9, the retaining cap 16 includes an outer surface 50 that is planar. Opposite the outer surface 50 is a seat portion 52. While it is depicted that the seat portion 52 is integral with retaining cap 16, this is merely preferred, and the two can be separate elements which together form the retaining cap 16. The seat portion 52 has a hemispherical shape.

It is preferred that an aperture 54 extends through the retaining cap 16 from the outer surface 50 to the seat portion 52. The aperture 54 may have a hexagonol shape, as depicted, or any other shape. A grease zerk 56 is disposed in the aperture 54 to allow grease to be introduced into the inner cavity 24.

One or more apertures 58 are disposed in the outer surface 50 of the retaining cap 16. Preferably the apertures 58 are threaded bores which will be described in more detail below.

The retaining cap 16 includes a threaded outer surface 60 configured to engage the threaded portion 38 of the inner cavity 24. Accordingly, in order to secure the ball member 14 in the housing 12, the retaining cap 16 is inserted into the second aperture 28 so that the threaded outer surface 60 engages the threaded portion 38 of the inner cavity 24. As the retaining cap 16 is rotated relative to the body 20 of the housing 12, it will apply an increasing pressure on the ball portion 44 of the ball member 14. As will be appreciated, as the pressure on the ball portion 44 is increased, the rotatability of the ball member 14 relative to the body 20 of the housing 12 will decrease. It is preferred that the locking member 18, when fully assembled, is completely disposed within the inner cavity 24 such that the locking member 18 does not extend above the end of the body 20 with the second aperture 28.

As seen in FIGS. 1 and 2, the locking member 18 prevents the retaining cap 16 from rotating relative the housing 12. The locking member 18 is disposed on the outer surface 50 of the retaining cap 16, preferably within the inner cavity 24 of the housing 12 proximate the second aperture 28. The locking member 18 may have any shape, including, for example, circular, square, diamond, oval, and the like. It is preferred that the locking member 18 comprises a planar disk.

Figure 10:
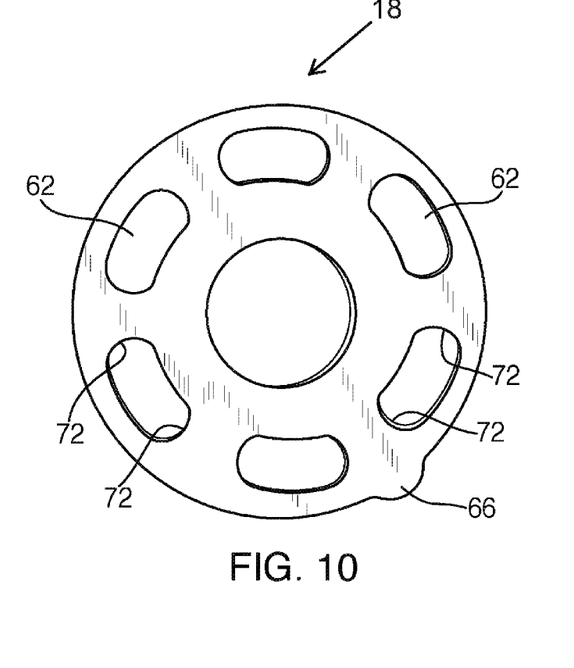

Turning to FIG. 10, the locking member 18 may include at least one slot 62. In a preferred configuration the locking member 18 includes six slots 62. The slots 62 are configured to allow threaded fasteners 64 (see, FIG. 1) to pass through the locking member 18 and secure the locking member 18 to the retaining cap 16. The slots 62 can have any shape provided that the slots 62 allow the threaded fasteners 64 to pass through the locking member 18. Accordingly, the slots 62 may be circles; however as described below, it is preferred that the slots 62 have an elongated arcuate shape.

The locking member 18 is also secured to the housing 12 so that the locking member 12 cannot rotate independently relative to the housing 12. Preferably, the perimeter of the locking member 18 includes one protrusion 66. The protrusion 66 is received in and engages a detent 68 in the housing 12. See, FIGS. 4 and 5. The engagement between the protrusion 66 and the detent 68 will prevent the locking member 18 from rotating independently of the housing 12. It is also contemplated that the protrusion 66 may be disposed on the housing 12 and one or more detents 68 are disposed about the perimeter of the locking member 12.

When the ball joint 10 is assembled as shown in FIG. 1, threaded shanks 70 (see, FIG. 3) of the threaded fasteners 64 pass through the locking member 12, and into the apertures 58 in the retaining cap 16. Heads 71 of the threaded fasteners 64 clamp against the locking member 18, to prevent the retaining cap 16 from rotating and thereby increasing or decreasing the pressure on the ball member 14. Preferably, the apertures 58 in the retaining cap 16 are threaded bores to engage with the threaded shanks 70.

As mentioned above, it is sometimes desirable to provide minor adjustments to the ball joint 10. Accordingly, the retaining cap 16 can be rotated relative to the housing 12 until the desired stiffness level is achieved. The threaded fasteners 64 may be inserted through slots 62, provided the apertures 58 in the retaining cap 16 are aligned with the slots 62 (discussed in more detail below). Provided that the apertures 58 in the retaining cap 16 and the slots 62 are aligned, the threaded fasteners 64 can be tightened. Prior to completely tightening the threaded fasteners 64, the retaining cap 16 can be further rotated relative to the housing 12 until the threaded fasteners 64 abut ends 72 of the slots 62 through which the threaded shanks 70 of the threaded fasteners 64 extend. Once the ball joint 10 has the desired stiffness, the threaded fasteners 64 can be fully tightened to lock the position of the retaining cap 16 relative to the housing 12.

As mentioned above, it is contemplated that the apertures 58 of the retaining cap 16 are not aligned with the slots 62 and are blocked by the portion of the locking member 18 between slots 62. Accordingly, the present invention provides multiple orientations for the slots 62 of the locking member 18 relative to the housing 12. Referring to FIG. 2, in order to provide multiple orientations for the slots 62 of the locking member 18 in regards to the position of the slots 62 in relation to the housing 12, the housing 12 includes multiple detents 68. Preferably, the detents 68 are angularly offset, i.e., all of the detents 68 are located on the circumference of the same circle relative to each other. This will allow the slots 62 in the locking member 18 to be equidistantly arranged, but the positions of the detents 68 will provide two different configurations of the slots 62 relative to the housing 12 depending on which detent 68 the protrusion 66 engages. Thus, the locking member 18 may be rotated by an angle between different detents 68 to provide for different angular positions of the locking member 18 relative to the housing.

It is contemplated that the various elements and structures used to maintain the locking member 18, the housing 12, and the retaining cap 16 rotationally fixed relative to one another may differ from the foregoing description. For example, as mentioned above, it is contempered that the locking member 18 include one or more detents, while the housing includes a protrusion.

Similarly, threaded fasteners 64 may be used to fix the locking member 18 to the housing 12 via, for example, threaded bores in the end of the body 20 proximate the second aperture 28. In such a design, the retaining cap 16 and the locking member 18 can be rotationally fixed relative to each other with one or more detents and a protrusion. Other similar corresponding structures could be used without departing from the present invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

What is claimed is:

1. A ball joint for connection between structural members, the ball joint comprising:
    a housing having a body with an outer surface, an inner cavity, a first aperture, and a second aperture, the first and second apertures disposed on opposite ends of the body and communicating with the cavity;
    a ball member comprising a ball portion and a shaft portion, the ball member configured such that ball portion is received within the inner cavity of the housing, the shaft portion extends out of the first aperture, and the ball portion is precluded from passing through the first aperture;
    a retaining cap having an outer surface and being configured to engage with inner cavity of the body and prevent the ball portion from passing through the second aperture, wherein the outer surface comprises at least one threaded bore;
    a locking member rotationally fixed relative to the housing, wherein the locking member comprises at least one slot and comprises a circular shape with a radially extending protrusion; and,
    a threaded fastener having a threaded shank passing through the at least one slot of the locking member and engaging the at least one threaded bore to prevent rotation of the retaining cap relative to the housing, and,
    wherein the housing includes at least two detents configured to receive the radially extending protrusion of the locking member in order to prevent the locking member from rotating independently of the housing, and
    wherein a first detent from the at least two detents provides a first orientation of the at least one slot relative to the housing, and
    wherein a second detent from the at least two detents provides a second orientation of the at least slot relative to the housing, and
    where the second orientation is different from the first orientation.

2. The ball joint of claim 1 wherein the locking member comprises plurality of slots, and wherein the retaining cap includes two threaded bores, each threaded bore configured to receive a threaded fastener.

3. The ball joint of claim 1 wherein the locking member comprises a planar disk.

4. The ball joint of claim 3 wherein the at least one slot of the locking member comprises a plurality of slots.

5. A ball joint for connection between structural members, the ball joint comprising:
   a housing having a body with an outer surface, an inner cavity having a threaded portion, a first aperture, and a second aperture, the first and second apertures disposed on opposite ends of the body;
   a ball member comprising a ball portion and a shaft portion, the shaft portion extending out of the first aperture of the housing;
   a retaining cap threadedly engaging the threaded portion of the inner cavity of the body and comprising at least one threaded bore;
   a locking member disposed in the housing, the locking member including at least one slot and comprises a circular shape with a radially protruding protrusion; and,
   a threaded fastener having a threaded shank passing through the at least one slot of the locking member and engaging the at least one threaded bore of the retaining cap to prevent rotation of the retaining cap relative to the housing, and,
   wherein the housing includes at least two detents, each detent configured to receive the radially protruding protrusion of the locking member in order to prevent the locking member from rotating independently of the housing, and
   wherein a first detent from the at least two detents provides a first orientation of the at least one slot relative to the housing, and
   wherein a second detent from the at least two details provides a second orientation of the at least slot relative to the housing, and
   wherein the second orientation is different from the first orientation.

6. The ball joint of claim 5 wherein the at least one slot of the locking member comprises a plurality of slots.

7. The ball joint of claim 6 wherein the slots each comprises ends which are configured to interfere with the threaded shank of the threaded fastener to block rotation of the retaining cap within the housing.

8. A ball joint for connection between structural members, the ball joint comprising:
   a housing having a body with an outer surface, an inner cavity comprising a threaded portion and a seat portion, a first aperture, and a second aperture, the first and second apertures disposed on opposite ends of the body, the first aperture extending through the seat portion;
   a ball member comprising a ball portion and a shaft portion, the shaft portion extending out of the first aperture of the housing, and the ball portion being received on the seat portion of the inner cavity;
   a retaining cap threadedly engaging the threaded portion the inner cavity of the housing;
   a second seat disposed between an outer surface of the retaining cap and the ball member, the second seat comprising a hemispherical shape;
   a circularly shaped locking member disposed in the housing and comprising a plurality of slots and a radially extending protrusion configured to engage with the housing; and,
   at least one fastener configured to engage the retaining cap and limit the rotation of the retaining cap relative to the locking member and the housing, and,
   wherein the housing includes at least two detents, each detent configured to receive the radially protruding protrusion of the locking member in order to prevent the locking member from rotating independently of the housing, and
   wherein a first detent from the at least two detents provides a first orientation of the plurality of slots to the housing, and
   wherein a second detent from the at least two detents provides a second orientation of the plurality of slots relative to the housing, and
   wherein the second orientation is different than the first orientation.

9. The ball joint of claim 8 wherein the second seat is integral with the retaining cap.

10. The ball joint of claim 9 further wherein the at least one fastener includes a threaded shaft that passes through a slot from the plurality of slots.

11. The ball joint of claim 10 wherein the plurality of slots of the locking member are spaced along a circumference of a circle.

12. The ball joint of claim 8 wherein the locking member is disposed within the second aperture of the housing.

* * * * *